(12) United States Patent
Meacham et al.

(10) Patent No.: US 9,109,622 B2
(45) Date of Patent: Aug. 18, 2015

(54) ROTOR SUPPORT STRUCTURES INCLUDING ANISOTROPIC FOIL BEARINGS OR ANISOTROPIC BEARING HOUSINGS AND METHODS FOR CONTROLLING NON-SYNCHRONOUS VIBRATIONS OF ROTATING MACHINERY USING THE SAME

(71) Applicant: HONEYWELL INTERNATIONAL INC., Morristown, NJ (US)

(72) Inventors: Walter Lee Meacham, Phoenix, AZ (US); Marshall Saville, Torrance, CA (US); Alan Margolis, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 24 days.

(21) Appl. No.: 13/680,847

(22) Filed: Nov. 19, 2012

(65) Prior Publication Data

US 2014/0140645 A1    May 22, 2014

(51) Int. Cl.
 *F16C 32/06* (2006.01)
 *F16C 17/02* (2006.01)
 *F16C 33/02* (2006.01)

(52) U.S. Cl.
 CPC .............. *F16C 17/024* (2013.01); *F16C 33/02* (2013.01); *Y10T 29/49647* (2015.01)

(58) Field of Classification Search
 CPC .............................. F16C 17/02; F16C 17/024
 USPC ................................................. 384/103–106
 See application file for complete search history.

(56) References Cited

U.S. PATENT DOCUMENTS

| | | | | |
|---|---|---|---|---|
| 4,262,975 A | * | 4/1981 | Heshmat et al. | 384/119 |
| 4,295,689 A | | 10/1981 | Licht | |
| 5,116,143 A | | 5/1992 | Saville et al. | |
| 5,634,723 A | * | 6/1997 | Agrawal | 384/106 |
| 6,450,688 B2 | | 9/2002 | Matsushima | |
| 6,682,219 B2 | | 1/2004 | Alam et al. | |
| 6,786,642 B2 | | 9/2004 | Dubreuil et al. | |
| 6,964,522 B2 | * | 11/2005 | Kang et al. | 384/103 |
| 7,553,086 B2 | * | 6/2009 | Kang et al. | 384/103 |
| 2003/0190099 A1 | | 10/2003 | Alam et al. | |

(Continued)

FOREIGN PATENT DOCUMENTS

WO        9919638 A1    4/1999

OTHER PUBLICATIONS

Brueel & Kjaer Vibro, AnisotropicBearingSupport. Retrieved on Sep. 13, 2012 from Internet: <URL: http://www.bkvibro.com/en/download/publications/encyclopaedia/a.htm.

(Continued)

*Primary Examiner* — James Pilkington
(74) *Attorney, Agent, or Firm* — Ingrassia Fisher & Lorenz, P.C.

(57) ABSTRACT

Rotor support structures including anisotropic foil bearings or anisotropic bearing housings are provided for controlling non-synchronous vibrations of rotating machinery. The rotor support structure comprises a foil bearing adapted to be disposed around a journal of a rotating rotor shaft and a bearing housing disposed around the foil bearing, wherein one of the foil bearing or the bearing housing is configured to be anisotropic. The anisotropic foil bearing and anisotropic bearing housing exhibit a stiffness in a first support direction that varies in magnitude from that in a second support direction that is substantially orthogonal to the first support direction.

5 Claims, 12 Drawing Sheets

(56) References Cited

U.S. PATENT DOCUMENTS

| | | |
|---|---|---|
| 2005/0163407 A1 | 7/2005 | Kang et al. |
| 2005/0201646 A1 | 9/2005 | Nagata et al. |
| 2007/0047858 A1* | 3/2007 | Hurley et al. ............... 384/106 |
| 2011/0052110 A1* | 3/2011 | Kim ............................ 384/106 |
| 2011/0243762 A1* | 10/2011 | Daikoku et al. ............ 417/321 |

OTHER PUBLICATIONS

Wettergren, H.L., et al. "Dynamic instability of a rotating asymmetric shaft with internal viscous damping supported in anisotropic bearings," Journal of Sound and Vibration 1996, pp. 75-84, vol. 195, No. 1.

Kellenberger, W. "Stability of high-speed shafts supported by anisotropic bearings with external and internal damping." Engineering Village. Retrieved on Sep. 26, 2012 from Internet <URL: http://www.engineeringvillage.com/controller/servlet/Controller?CID=quickSearchAbstract.

EP Search Report for EP 13189161.6-1751 dated Mar. 3, 2014.

EP Exam Report for EP 13189161.6-1751 dated Mar. 19, 2014.

* cited by examiner

ROTOR SUPPORT STRUCTURES INCLUDING ANISOTROPIC FOIL BEARINGS OR ANISOTROPIC BEARING HOUSINGS AND METHODS FOR CONTROLLING NON-SYNCHRONOUS VIBRATIONS OF ROTATING MACHINERY USING THE SAME

TECHNICAL FIELD

The present invention generally relates to oil-free bearings for rotating machinery, and more particularly relates to rotor support structures including anisotropic foil bearings or anisotropic bearing housings and methods for controlling non-synchronous vibration of rotating machinery using the same.

BACKGROUND

Vibrations are caused in the normal operation of various types of rotating machinery, for example, aircraft turbine engines, rotating devices deployed on-board satellite and other spacecraft for attitude adjustment purposes, such as control moment gyroscopes and reaction wheels, automobile turbochargers, generators and pumps, and the like. When machinery rotates, there can be loads or forces created due to imbalances in the rotation, causing synchronous vibrations. In addition, rotating machinery can also experience non-synchronous vibrations, often the result of destabilizing forces and/or an unstable rotor-bearing system. Non-synchronous vibrations may result in excessive rotor response and/or excessive noise, both of which are unacceptable because they produce unacceptable bearing loads, engine vibration, and/or audible noise. Non-synchronous vibrations may have a detrimental effect on both the performance of the rotating machinery and the comfort of persons who may be present on-board a vehicle associated with the rotating machinery (e.g., airplane, helicopter, automobile, etc.). For example, the vibrations can travel through the frame of an airplane to compartments containing passengers and operators. While not harmful, vibrations and the attendant noise can be an unpleasant aspect of travel for the occupants.

Bearings are used between rotating and stationary components of machinery to reduce friction therebetween and support the rotating component, and to extend the useful lives of the machinery. Use of oil-free bearings, such as foil bearings, removes the need for an oil lubrication system and provides other significant benefits. Foil bearings are currently used in many applications, both terrestrial and in aerospace. Foil bearings have been used in a rotor support structure to support a rotating shaft in a wide range of turbomachinery. The foil bearing supports a load of the rotor shaft via a fluid film formed as a result of the rotor shaft rotation, and thus may be called a hydrodynamic foil bearing. Bearing stiffness is a significant factor in providing support as the shaft rotates relative to the stationary components. Conventional foil bearings exhibit isotropic stiffness, i.e., the stiffness in the first support direction is the same in magnitude as the stiffness in the second support direction. Stiffness, K, is the rigidity of the foil bearing (or bearing housing), i.e., the extent to which it resists deformation in response to an applied force (F). The higher the stiffness, the less compliance (i.e., deflection) there will be when loads or destabilizing forces are applied, thereby affecting control of non-synchronous vibrations. Conventional foil bearings lack the ability to provide effective non-synchronous vibration isolation.

Accordingly, it is desirable to provide rotor support structures including anisotropic foil bearings or anisotropic bearing housings and methods for controlling non-synchronous vibration using the same. It is also desirable for the anisotropic foil bearings and anisotropic bearing housings to be lightweight and capable of being retrofitted into existing rotating machinery, such as a gas turbine engine. Furthermore, other desirable features and characteristics of the present invention will become apparent from the subsequent detailed description of the present invention and the appended claims, taken in conjunction with the accompanying drawings and this background of the invention.

BRIEF SUMMARY

Rotor support structures are provided for controlling non-synchronous vibrations of rotating machinery. In accordance with one exemplary embodiment, the rotor support structure comprises a foil bearing adapted to be disposed around a journal of a rotating rotor shaft and a bearing housing disposed around the foil bearing, wherein one of the foil bearing or the bearing housing is configured to be anisotropic. The anisotropic foil bearing and anisotropic bearing housing exhibit a stiffness in a first support direction that varies in magnitude from that in a second support direction that is substantially orthogonal to the first support direction.

Anisotropic foil bearings are provided for controlling non-synchronous vibrations of rotating machinery, in accordance with yet another exemplary embodiment of the present invention. The anisotropic foil bearing comprises a bearing sleeve comprising an inner bore therethrough having a diameter to define a radial sway space between an inner circumferential surface of the bearing sleeve and an outer surface of a rotating rotor shaft and adapted for receiving a support fluid therein. At least two foils are circumferentially disposed within the radial clearance of the bearing sleeve, each foil having a foil stiffness. One or both of the sway space and the foil stiffness of at least one foil of the at least two foils in a first support direction is/are configured to be different from that in a second support direction that is substantially orthogonal to the first support direction, resulting in stiffness of the anisotropic foil bearing being different in the first support direction from that in the second support direction.

Methods are provided for controlling non-synchronous vibrations in rotating machinery, in accordance with yet another exemplary embodiment of the present invention. The rotating machinery includes a rotor support structure for supporting a rotating shaft. The method comprises the steps of providing an anisotropic foil bearing adapted to be included in the rotor support structure and disposing, the anisotropic foil bearing around a journal of the rotating shaft. The step of providing the anisotropic foil bearing comprises making the sway space, the foil stiffness, or both the sway space and the foil stiffness in a first support direction different than that in a second support direction substantially orthogonal to the first support direction.

Furthermore, other desirable features and characteristics of the rotor support structures including anisotropic foil bearings or anisotropic bearing housings for controlling non-synchronous vibrations of rotating machinery will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
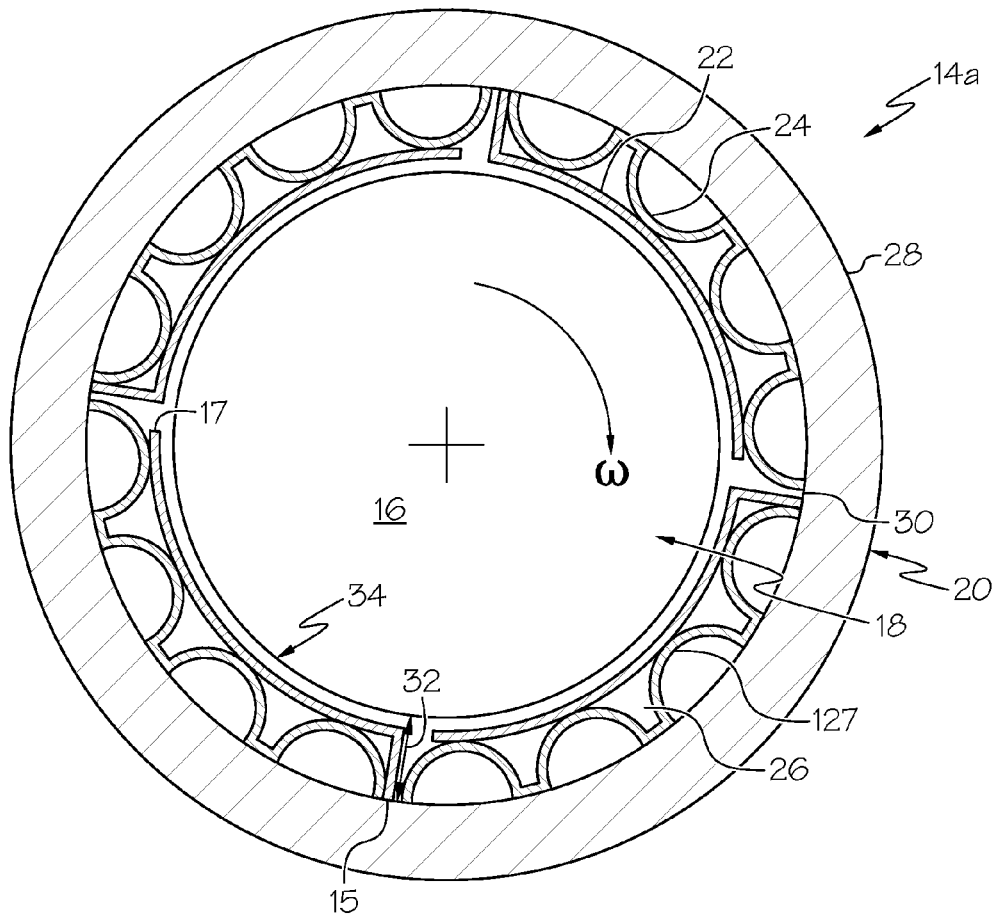
FIG. 1 is a cross-sectional view of an exemplary conventional isotropic foil bearing.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to rotor support structures including anisotropic foil bearings or anisotropic bearing housings and methods for controlling non-synchronous vibration of rotating machinery using the same. The rotor support structure comprises one of an anisotropic foil bearing or an anisotropic bearing housing. As used herein, the terms "anisotropy" and "anisotropic" refer to the stiffness of the foil bearing or bearing housing in a first support direction being different in magnitude from the stiffness thereof in a second support direction substantially orthogonal to the first support direction, thereby controlling non-synchronous vibrations of the rotating machinery. As noted above, stiffness, K, is the rigidity of an object, i.e., the extent to which it resists deformation in response to an applied force (F). Anisotropic stiffness or support controls non-synchronous vibrations by providing elastic forces that oppose the destabilizing forces that result in non-synchronous vibration. More specifically, anisotropic stiffness results in lower speed modes being decoupled in the plane of rotation, e.g., the vertical mode will be at one frequency and the horizontal modes will be at a second frequency. The result is that cross-coupling (anisotropy) counteracts non-synchronous (i.e., destabilizing) forces. The complementary concept is flexibility or pliability—the more flexible an object, the less stiff an object. Anisotropic stiffness may also affect damping as there is some dependency between stiffness and damping. Increased stiffness may result in increased or decreased damping, depending upon the arrangement. Damping can be the same or different in the first and second support directions. Damping primarily controls synchronous vibrations. An anisotropic foil bearing, much like a conventional foil bearing, comprises a bearing sleeve lined with at least one foil, and more typically two foils, a top foil and a bump foil. At least one intermediate foil may be disposed between the top foil and the bump foil. Each foil has a foil stiffness. The top foil is adapted to be disposed around a journal of a rotor shaft. The foil bearing supports a load of the rotor shaft via a fluid film as noted previously. The stiffness of the foil bearing, when operating, results from the fluid film and the foils. The foils tend to be softer relative to the fluid film. In a foil bearing, the term "sway space" applies to an annular clearance gap (i.e., the radial clearance) between the top foil and the rotating shaft surface that is allocated to allow a small amount of shaft radial motion while the foil bearing is sitting idle. The sway space defines the linear range of operation for the foil bearing, i.e., the sway space is the linear low stiffness portion of the foil bearing operating range. Shaft radial motion may be possible from "play" that exists in the compliant support structure, such as between the top foil and bump foil and between the bump foil and the bearing sleeve. In addition, there may also be room for the shaft to move in small spaces created by the top foil not fully conforming to the round surface of the rotating shaft. The size of the sway space affects the stiffness (and may also affect damping) of the rotor support structure and foil bearing. For example, a larger sway space in the first support direction reduces the stiffness of the foil bearing in the first support direction as the larger sway space permits the rotor shaft to radially move in that direction with less resistance, i.e., there will be a higher stiffness in the direction with less sway space. A smaller sway space results in less motion required to transition from the low stiffness portion of the anisotropic foil bearing load-deflection characteristics to the higher stiffness. Also, structural damping may be affected by a larger sway space as shaft radial motion is restricted to the fluid film instead of being transmitted to the compliant support structure where Coulomb damping occurs, as hereinafter described. The anisotropic foil bearing according to exemplary embodiments is configured such that the sway space and/or foil stiffness is different in the first support direction relative to the second support direction by specially configuring the cross-sectional shape of the bearing sleeve (to configure the sway space) and/or by configuring, for example, one or more foil characteristics such as foil thickness, foil height, foil spacing, foil pitch, foil pitch ratios and combinations thereof in the first support direction as hereinafter described (to configure the sway space and/or foil stiffness). The term "foil" as used herein, unless otherwise indicated, refers to the top foil, the bump foil, and the at least one intermediate foil. The terms "first support direction" and "second support direction" may be any direction as long as the second support direction is substantially orthogonal to the first support direction.

Figure 2:
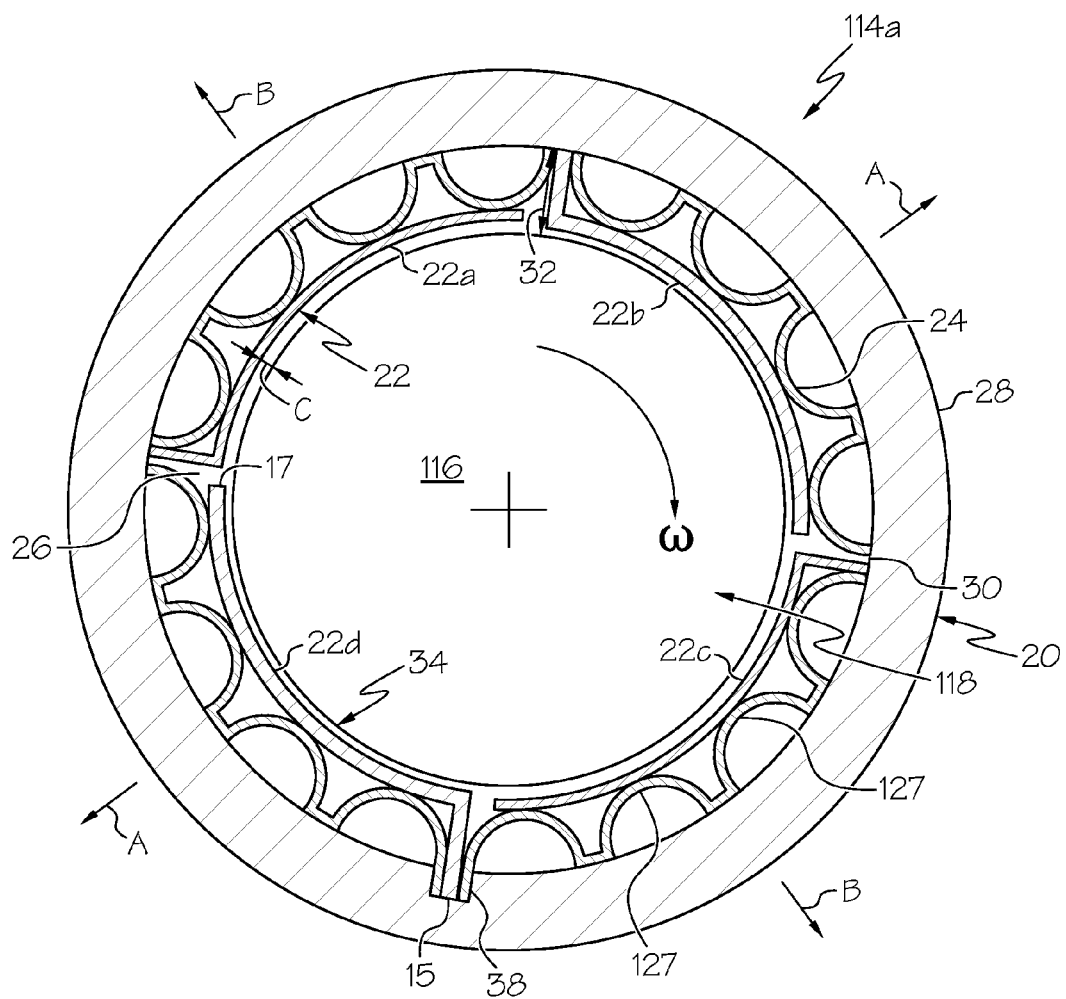
FIG. 2 is a cross-sectional view of an anisotropic foil bearing in accordance with exemplary embodiments.
Figure 3:
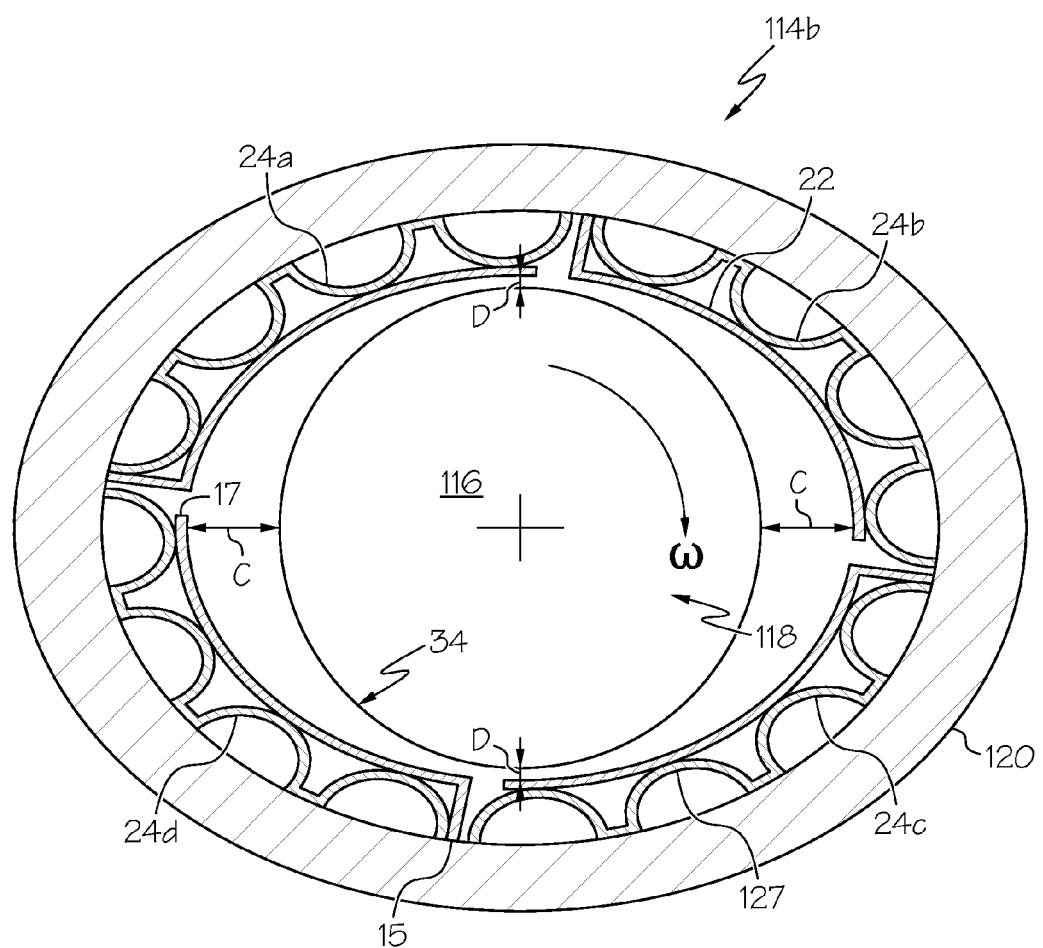
FIG. 3 is another cross-sectional view of an anisotropic foil bearing in accordance with yet another exemplary embodiment.
Figure 14:
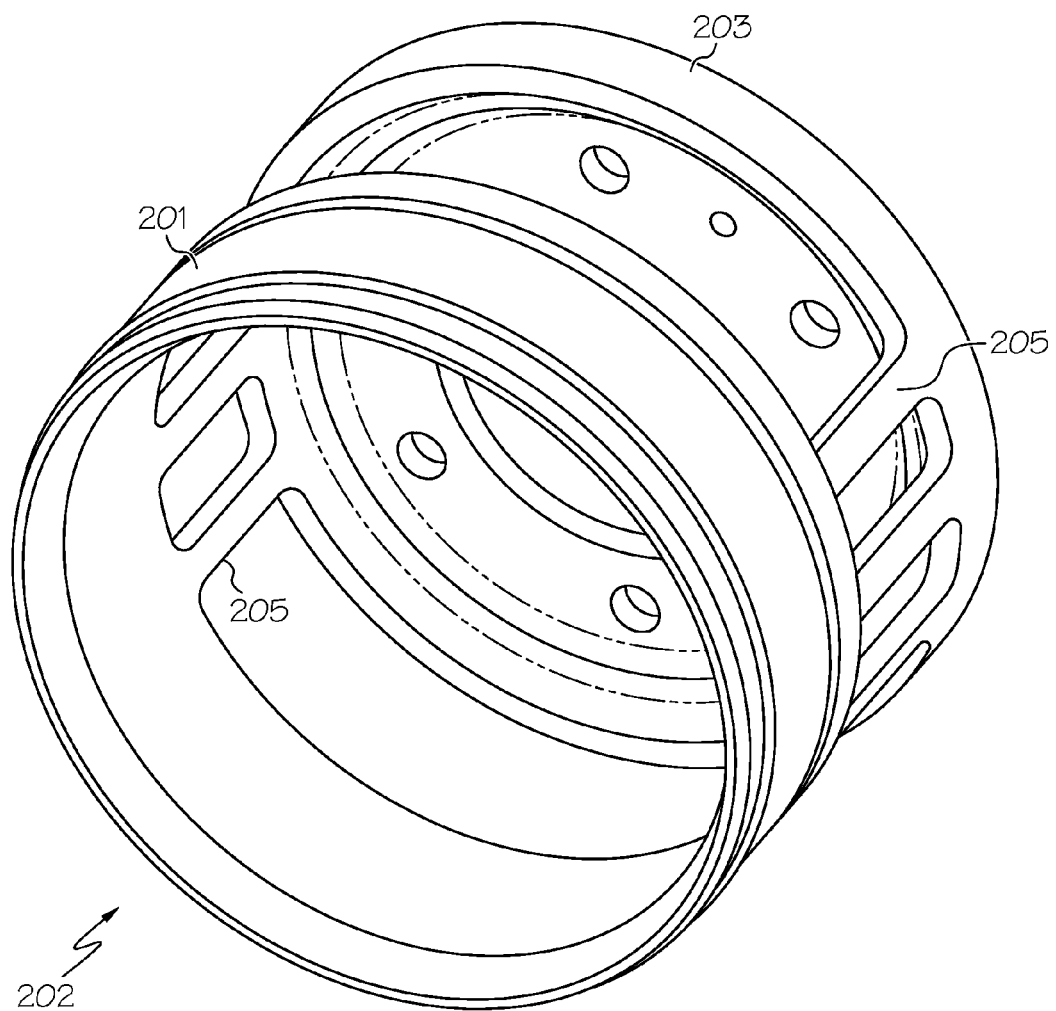
FIG. 14 is a perspective view of the anisotropic bearing housing of FIGS. 12 and 13.

Referring to FIG. 14, in accordance with exemplary embodiments, a method 10 for controlling non-synchronous vibrations in rotating machinery begins by providing an anisotropic foil bearing (step 11). FIG. 1 illustrates an exemplary conventional foil bearing 14a disposed around a journal 16 of a rotatable shaft 18. Conventional foil bearing 14a is an isotropic foil bearing, i.e., stiffness in a first support direction is the same as the stiffness in a second support direction. FIGS. 2 and 3 illustrate, respectively, anisotropic foil bearing 114a and anisotropic foil bearing 114b in accordance with exemplary embodiments. Each of the anisotropic foil bearings 114a and 114b is disposed around a journal 116. The journal 116 is the part of the rotatable shaft 118 that contacts the foil bearing.

Referring still to FIGS. 1 through 3, each of foil bearings 14a, 114a, and 114b comprise a bearing sleeve 20/120 (FIG. 3) lined with at least a top foil 22 and a bump foil 24. The bearing sleeve 20/120 (FIG. 3) has an inner bore 26 therethrough, an outer surface 28, and an inner circumferential surface 30 disposed around the journal 16/116 such that an annular clearance gap 32 is radially defined between a journal outer surface 34 and the inner circumferential surface 30 of the bearing sleeve. The annular clearance gap 32 is adapted for accommodating a fluid film therein as hereinafter described. The annular clearance gap axially extends along a substantial portion of a length of the bearing sleeve. The annular clearance gap provides a sway space for the rotor shaft to radially move in the foil bearing as noted above. The top foil 22 and the bump foil 24 are disposed in the annular clearance gap and are arranged in a circumferential direction in such a manner that a leading edge 15 of the top foil is attached to the bearing sleeve in a cantilever fashion with a trailing edge 17 being urged toward the rotating shaft. The leading and trailing edges of the bump foil are also attached to the bearing sleeve, as hereinafter described.

The top foil and bump foil 22 and 24 may be made of a material such as a nickel-based superalloy sheet material. The innermost sheet metal foil or "top foil" 22 is smooth and constitutes the bearing inner surface against which the rotating rotor shaft 18/118 operates. Top foil properties include top foil thickness (i.e., cross-sectional material thickness). While a single top foil 22 in four segments is illustrated in FIGS. 1 through 3 (the four exemplary top foil segments are identified in FIGS. 2 as 22a, 22b, 22c, and 22d), it is to be understood that a plurality of top foils and/or a lesser or greater number of top foil segments may be used. In addition, the top foil may be non-segmented (see, e.g., FIG. 4A). The top foil 22 may be solid as shown, in leaf-form or otherwise as known to one skilled in the art.

The top foil 22 is supported by a compliant structure, often made up of a layer of corrugated sheet metal foil referred to as the bump foil 24. The bump foil consists of bumps 127 that behave like springs and which have been pre-formed into the foil. The bumps may be uniformly or non-uniformly spaced. The bumps may have a generally cylindrical cross-sectional shape as shown in FIGS. 1 through 3, or any number of other cross-sectional shapes. Bump foil properties include bump thickness (i.e., cross-sectional thickness) J (FIG. 5B), bump height I (FIG. 5B), and bump pitch (FIGS. 7A and 7B), as hereinafter described. In conventional foil bearing 14 and anisotropic foil bearings 114a and 114b, there are four separate segments of bump foil 24a, 24b, 24c, and 24d (FIG. 3) corresponding to the four top foil segments 22a, 22b, 22c, and 22d. It is to be understood, however, that the number of bump foil segments does not have to correspond to the number of top foil segments. Each illustrated bump foil segment has four bumps. It is to be understood that there may be a lesser or greater number of bump foil segments (including a non-segmented bump foil (see, e.g., FIG. 4A) and that each bump foil segment may have a different number of bumps.

As known in the art, the bump foil 24 gives the foil bearing flexibility that allows it to tolerate significant amounts of misalignment and distortion that would otherwise cause a rigid bearing to fail. In addition, micro-sliding between the top foil and bump foil and the bump foil and the bearing sleeve generates Coulomb damping that increases the dynamic stability of the rotor support system. Thus, along with the fluid film, the bump foil defines the foil bearing stiffness and also provides damping from the frictional microsliding between the top foil and other adjacent surfaces. While not shown in anisotropic foil bearings 114a or 114b, at least one intermediate foil may be disposed between the top foil and the bump foil. The intermediate foil may be used to increase damping by having more interfaces for Coulomb damping and/or to increase foil bearing stiffness by providing a greater load share between the bump foil bumps.

Figure 4A:
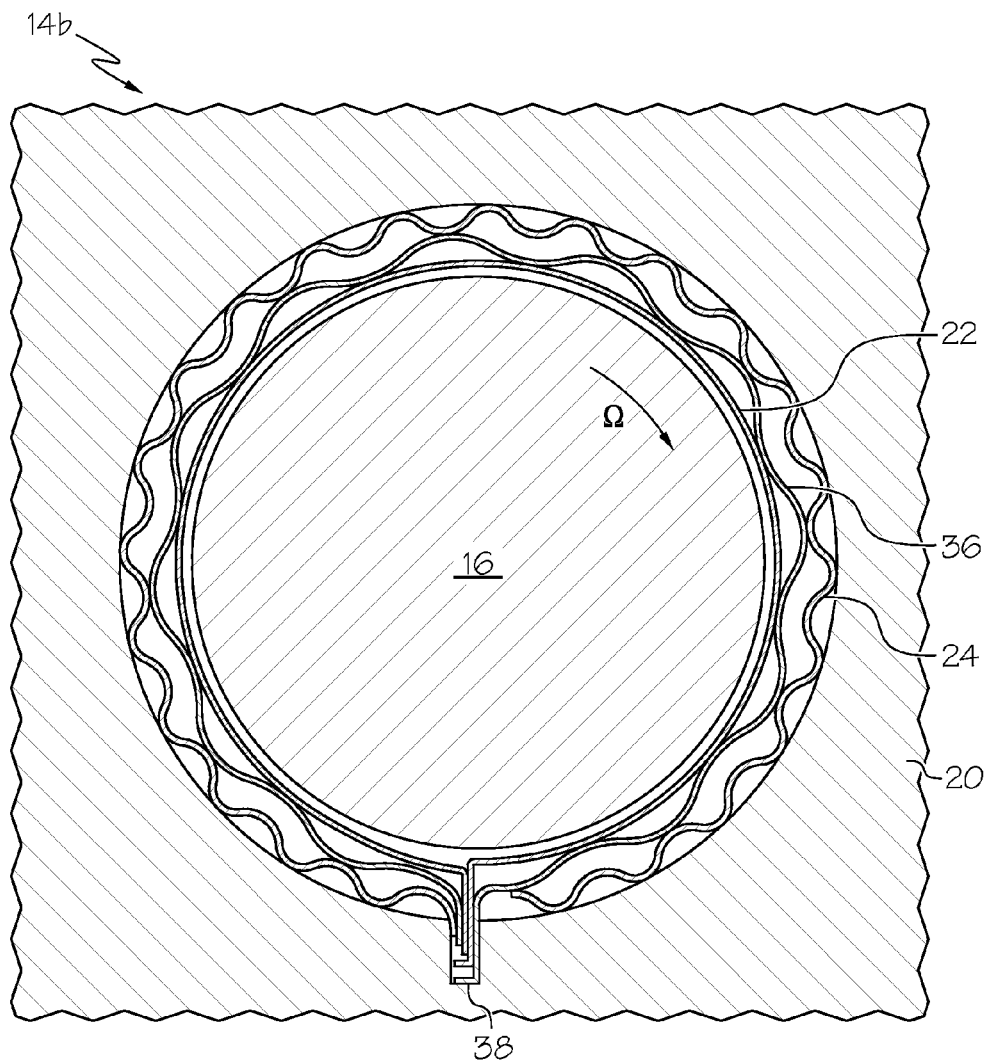
FIG. 4A is a cross-sectional view of another exemplary conventional isotropic foil bearing.
Figure 9:
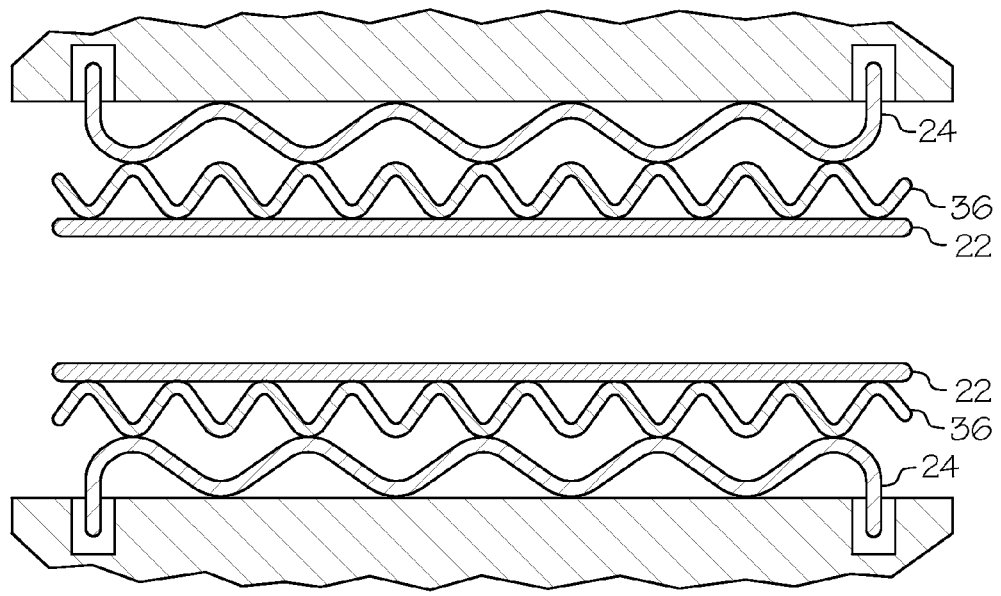
FIG. 9 is an enlarged view of diametrically and circumferentially opposed portions in a first support direction of an anisotropic foil bearing such as shown in FIG. 5A, the anisotropic foil bearing configured such that anchoring of the bump foil in anti-rotation slots at different intervals changes the bump foil stiffness.

As also known in the art, one or more of the foils may be retained in the bearing sleeve at the leading edge 15, the trailing edge 17 (if one exists), or at both the leading and trailing edges 15 and 17. For example, the leading and/or trailing edge of one or more foils may be welded to the bearing sleeve 20 as shown in FIG. 1, to bearing sleeve 120 in FIG. 3 or retained in one or more anti-rotation slots 38 in the inner circumferential surface 30 of the bearing sleeve 20 (e.g., FIGS. 2, 4A, and 9). The leading and/or trailing edges are retained to prevent the foil(s) from moving in the circumferential direction. In addition, retaining the foil(s) at the leading and/or trailing edges may be used to increase stiffness thereat, as hereinafter described. FIG. 2 shows the leading edge 15 of the top and bump foils retained in a single anti-rotation slot 38. FIG. 4A shows the leading and trailing edges 15 and 17 of the top and intermediate foils being retained in a single anti-rotation slot, while only the leading edge 15 of the bump foil is retained in the anti-rotation slot. FIG. 9 shows both the leading and trailing edges of the bump foil there retained in respective anti-rotation slots. While FIGS. 2 and 4A illustrate one anti-rotation slot 38, it is to be understood that a fewer or greater number of anti-rotation slots may be used. For example, FIG. 9 shows two anti-rotation slots in which the leading and trailing edges of the bump foil 24 are respectively anchored (retained). The anti-rotation slots of FIG. 9 are spaced apart every eighth turn of the illustrated bump foil portion.

Referring now specifically to FIG. 2, in accordance with exemplary embodiments, the anisotropic foil bearing 114a has been configured such that a top foil thickness is greater in a first support direction (indicated with arrows A) than in a second support direction (indicated with arrows B) that is substantially orthogonal to the first support direction i.e., the top foil is thinner in the second support direction. In the illustrated embodiment, the thicker top foil segments are top foil segments 22b and 22d and the thinner top foil segments are 22a and 22c. The thicker top foil at diametrically and circumferentially opposed sections in the first support direction of the exemplary anisotropic foil bearing 114a of FIG. 2 is stiffer than the thinner top foil, thereby increasing the foil stiffness in the anisotropic foil bearing 114a in the first support direction relative to the second support direction, and decreases a magnitude of a sway space C in the first support direction. Thus, for anisotropic foil bearing 114a, the stiffness provided in the first support direction is greater than the stiffness provided in the second support direction. The damping in the first support direction may also be greater or lower than the damping in the second support direction, although damping may be the same in both the first and second support directions. It is to be understood that the first support direction may be any direction (i.e., it is not limited to the direction illustrated in FIG. 2) as long as the second support direction is substantially orthogonal to the first support direction, i.e., the first and second directions are substantially orthogonal.

Referring now specifically to FIG. 3, in accordance with another exemplary embodiment, a bearing sleeve 120 of anisotropic foil bearing 114b is out of round such that the sway space C is different in a first support direction from that in a second support direction that is substantially orthogonal to the first support direction. As used herein, the term "out of round" means that the cross section of the bearing sleeve 120 deviates from a true circle. The bearing sleeve in anisotropic foil bearing 114b is substantially oval although other out of round shapes may be used. A horizontal sway space (identified with double-headed arrows C) in FIG. 3 is larger than a vertical sway space (identified with double-headed arrows D for ease of illustration) in the illustrated anisotropic foil bearing 114b of FIG. 3. The larger sway space in the first support direction (in this example, the horizontal direction) than in the second support direction (in this example, the vertical direction) reduces stiffness in the first support direction so the rotor shaft 118 can radially move in the horizontal direction with less resistance than in the vertical direction. While a larger sway space in the horizontal direction relative to the sway space in the vertical direction is illustrated, it is to be understood that the larger sway space may be in the vertical direction relative to the horizontal direction. It is also to be understood that while the first support direction in the illustrated anisotropic foil bearing 114b of FIG. 3 is a horizontal direction and the second support direction is a vertical direction, the first support direction may be any direction as noted above (i.e., it is not necessarily vertical or horizontal (see, e.g., FIG. 2)) as long as the second support direction is substantially orthogonal to the first support direction, i.e., the first and second directions are substantially orthogonal.

Figure 4B:
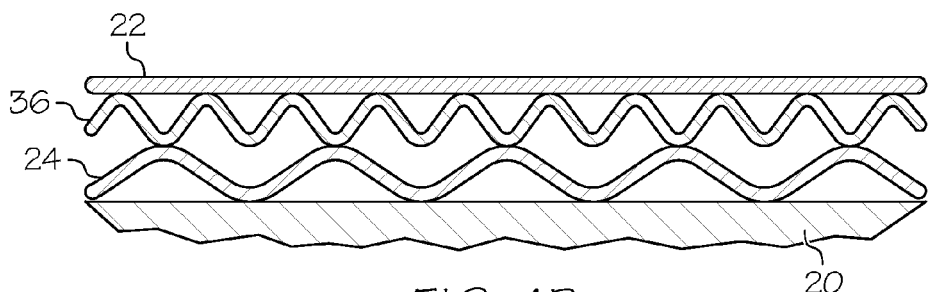
FIG. 4B is an enlarged view of a top foil, an intermediate foil, and a bump foil in a circumferential portion of the isotropic foil bearing of FIG. 4A.
Figure 4C:
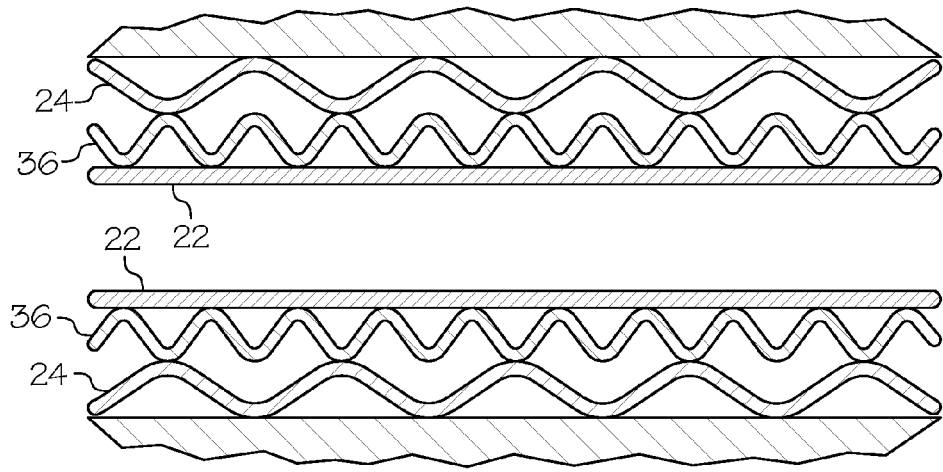
FIG. 4C is another enlarged view of the top foil, the intermediate foil, and the bump foil of FIGS. 4A and 4B in diametrically and circumferentially opposed portions in a first support direction (in this case, a vertical direction) of the exemplary conventional isotropic foil bearing of FIG. 4A.

Referring now to FIGS. 4A and 4B, in accordance with exemplary embodiments, another conventional isotropic foil bearing 14b (FIG. 4A) is disclosed. Isotropic foil bearing 14b comprises a substantially cylindrical bearing sleeve 20 lined with the non-segmented top foil 22, the bump foil 24, and an intermediate foil 36 disposed between the top foil and the bump foil. FIG. 4B is an enlarged view of the foils in FIG. 4A. In the illustrated embodiments, the intermediate foil comprises a wavy shim. The wavy shim comprises a plurality of waves, each of the waves having a cross-sectional shape, a wave height, a wave thickness, a wave pitch, and a wave length. As noted previously, the leading edge 15 of each of the foils is retained or fixed in the anti-rotation slot 38 of the bearing sleeve 20. The trailing edge 17 of the top foil and wavy shim is fixed in the same anti-rotation slot, while the trailing edge 17 of the bump foil 24 is free. It is to be understood that the anchoring pattern of the foils, whether by welding to the bearing sleeve or by retention in the one or more anti-rotation slots may vary depending upon the application including the desired foil stiffness as hereinafter described.

Figure 5A:
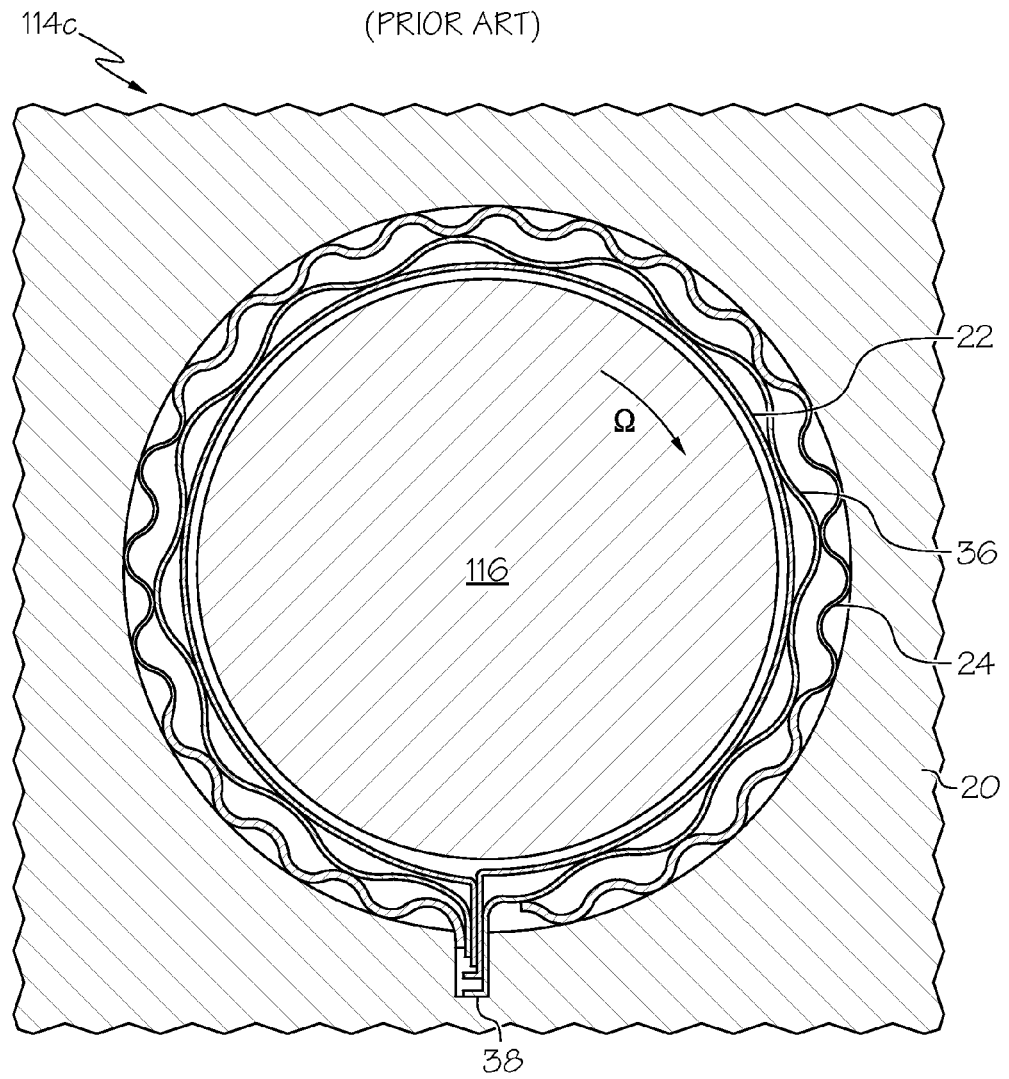
FIG. 5A is a cross-sectional view of an exemplary anisotropic foil bearing in accordance with yet another exemplary embodiment.
Figure 5B:
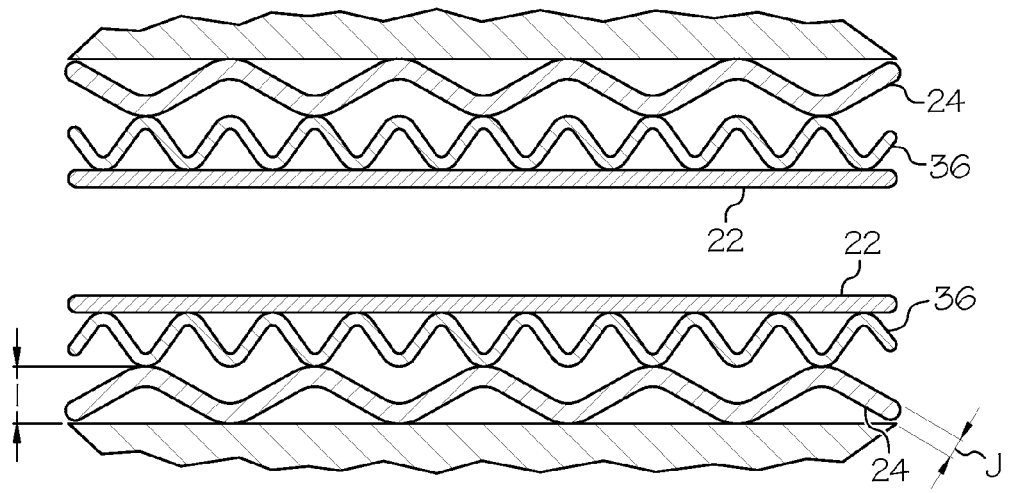
FIG. 5B is an enlarged view of the top foil, the intermediate foil, and the bump foil in diametrically and circumferentially opposed portions in a first support direction (in this case, a vertical direction) of the anisotropic foil bearing of FIG. 5A, the bump foil thickness in the first support direction being thicker and thus stiffer than in a second support direction.

Referring now to FIG. 5A, in accordance with exemplary embodiments, another exemplary anisotropic foil bearing 114c is shown. The diametrically and circumferentially opposed quarter portions of the anisotropic foil bearing 114c are shown. FIGS. 5A and 5B illustrate the top foil 22, the bump foil 24, and the intermediate foil 36 included in the diametrically and circumferentially opposed quarter portions. FIG. 5B is an enlarged view of the foils of FIG. 5A, more clearly illustrating that the bump foil thickness J is greater in the first support direction (here, a vertical direction) relative to the bump foil thickness in the second support direction (here, a horizontal direction). As used herein, "thickness" refers to the material cross section. As the bump foil thickness is greater in the first support direction relative to the second support direction, the bump foil stiffness in the first support direction is greater than the bump foil stiffness in the second support direction. While varying the bump foil thickness has been illustrated, it is to be understood that the top foil thickness (such as in FIG. 2), the intermediate foil thickness (if used), or both, may alternatively or additionally be varied to change the stiffness of the anisotropic foil bearing in the first direction relative to the second support direction that is substantially orthogonal with the first support direction. The foil thickness may be changed in either the first or second support directions depending on the desired location of the foil stiffness and the foil thickness may be increased or decreased depending on whether an increase or a decrease in foil stiffness is desired. The thicker the foil, the stiffer the foil. As noted above, while the first support direction in FIGS. 5A and 5B is described as a vertical direction, it does not have to be as long as the second support direction is substantially orthogonal to the first support direction. Moreover, the diametrically and circumferentially opposed portions are not necessarily quarter portions. There could be any number of portions. For example, there may be four 45° portions, three 120° portions, two 90° portions, or the like. The foil characteristics can be different in each portion as long as the overall foil bearing stiffness varies in substantially orthogonal directions.

While the anisotropic foil bearing may be configured such that the foil thickness is greater in the first support direction relative to the second support direction so as to provide anisotropic foil stiffness, the sway space in the anisotropic foil bearing may not change if the foil height is the same in both support directions. However, a change in foil height in the first support direction relative to the second support direction affects the magnitude of the sway space and effects a change in foil stiffness. Increasing the foil height decreases the sway space and increases the stiffness while decreasing the foil height increases the sway space and decreases the stiffness thereat. In accordance with exemplary embodiments, the bump height(s) (and/or wave height) may be varied in the bump foil every quarter (corresponding to a first or second support direction) to vary the sway space and foil stiffness thereat.

Figure 6:
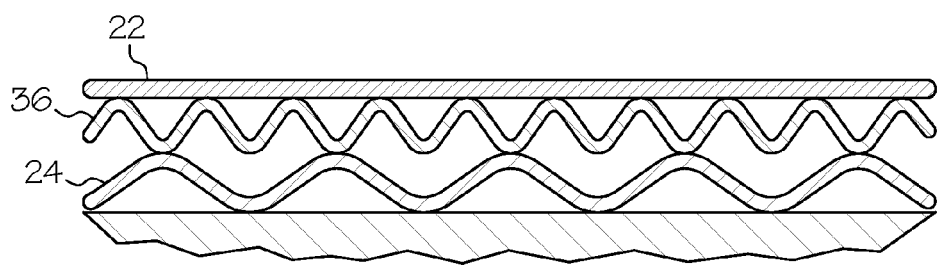
FIGS. 6 and 7 are enlarged views of circumferential portions of an anisotropic foil bearing such as shown in FIG. 5A, the anisotropic foil bearing configured such that the pitch ratio in FIG. 6 is smaller than the pitch ratio in FIG. 7.
Figure 7:
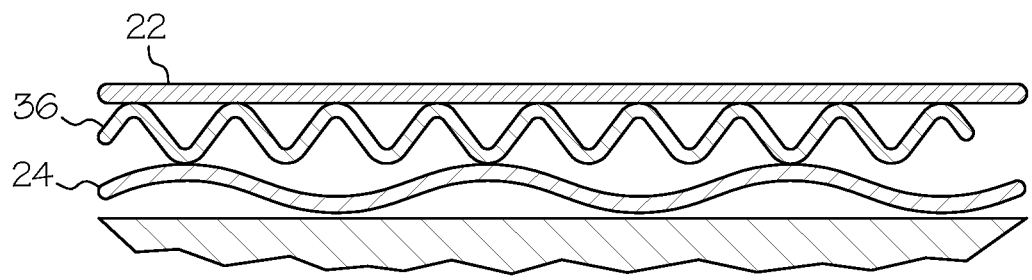

Foil pitch and foil pitch ratios may also affect foil stiffness (and thus foil bearing stiffness). As used herein, the term "foil pitch" refers to the center-to-center distance between adjacent bumps of the bump foil and/or the center-to-center distance between adjacent waves of the wavy shim and the term "foil pitch ratio" refers to the bump foil pitch/wavy shim pitch. Referring now to FIGS. 6 and 7 illustrating a circumferential portion of the anisotropic foil bearing such as shown in FIG. 5A (two circumferential portions define the diametrically and circumferentially opposed portions (such as shown in FIG. 5B), the foil pitch ratio in FIG. 6 is 2:1 whereas the foil pitch ratio in FIG. 7 is 3:1. The anisotropic foil bearing is stiffer in the direction in which the foil pitch ratio is lower. It is to be understood that while foil pitch ratios of 2:1 and 3:1 have been described, other foil pitch ratios may be used such the anisotropic foil bearing is configured so that the stiffness in the first support direction is different than the stiffness thereof in the second support direction.

Figure 8:
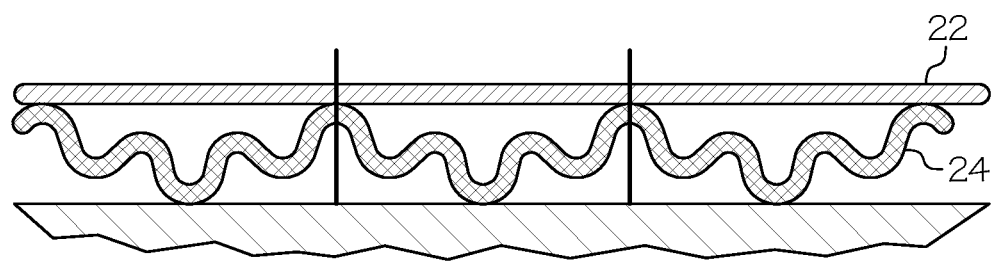
FIG. 8 is an enlarged view of a circumferential portion of an anisotropic foil bearing such as shown in FIG. 5A, illustrating major bump spacing.

Foil spacing may also affect foil stiffness. Referring now to FIG. 8, illustrating another circumferential portion of the anisotropic foil bearing such as shown in FIG. 5A (the intermediate foil has been omitted for ease of illustration), the bump height and/or spacing between major bumps of the bump foil affects foil stiffness. As used herein, the term "major bump" refers to the tallest bumps in the bump foil. Similarly, the term "major wave" refers to the tallest waves in the wavy shim (if present). Other foil spacing may be effected to increase or decrease foil stiffness in the first support direction relative to the second support direction. The smaller the spacing between the major bumps, the stiffer the bump foil in that direction making the foil bearing stiffer in that direction. Conversely, the larger the spacing between the major bumps (and major waves, if used), the foil stiffness is less and the foil bearing stiffness in that direction is less.

Figure 10:
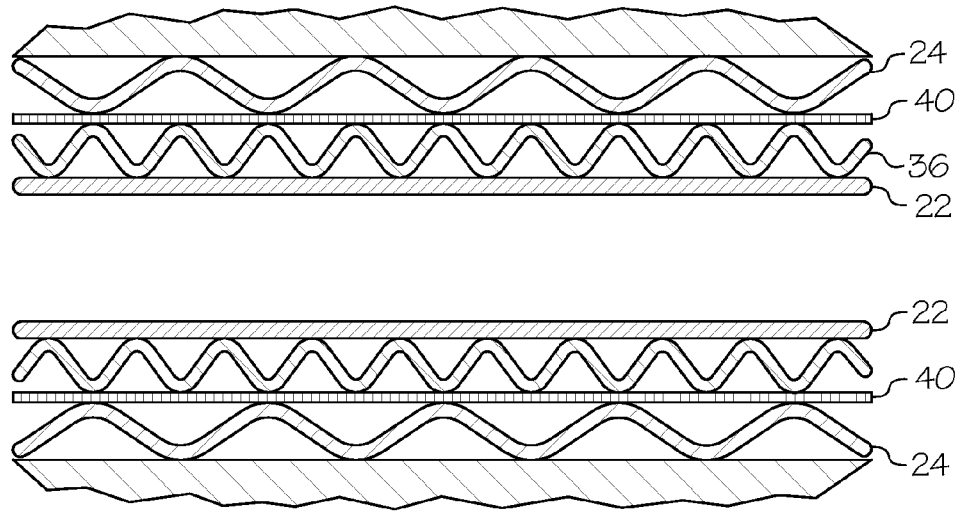
FIG. 10 is an enlarged view of diametrically and circumferentially opposed portions in a first support direction of an anisotropic foil bearing such as shown in FIG. 5A, the anisotropic foil bearing configured with a secondary intermediate foil disposed between the top foil and the bump foil, thereby decreasing the sway space and increasing foil bearing stiffness in the first support direction relative to a second support direction.
Figure 11:
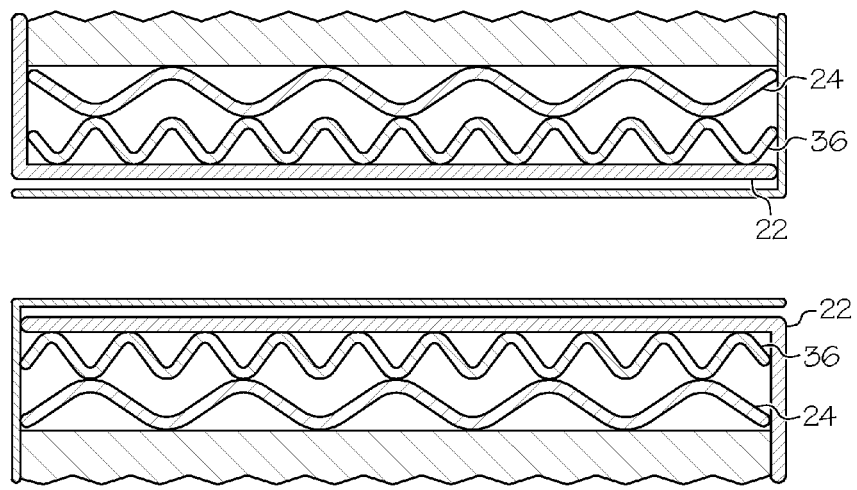
FIG. 11 is an enlarged view of diametrically and circumferentially opposed portions in a first support direction of an anisotropic foil bearing such as shown in FIG. 5A, the anisotropic foil bearing configured with overlapping foils to decrease the sway space in the illustrated first support direction.

Other variations in foil characteristics as well as the number of foils may affect the sway space and/or foil stiffness in the anisotropic foil bearing according to exemplary embodiments such that the stiffness provided in the first support direction is different than the stiffness provided in the second support direction. For example, in accordance with exemplary embodiments, FIGS. 9 through 11 illustrate diametrically and circumferentially opposed portions of an anisotropic foil bearing such as shown in FIG. 5A. In FIG. 9, the leading and trailing edges of the bump foil 24 are anchored in adjacent anti-rotation slots 38 every eighth turn instead of every fourth turn as shown, for example, for the bump foil of FIG. 2. Thus, the bump foil in FIG. 2 is stiffer (has a greater foil stiffness) than the bump foil in FIG. 9 as the bump foil in FIG. 2 is anchored more frequently than in FIG. 9. Sway space has not been affected by changing the anchor frequency. In FIG. 10, a secondary intermediate foil 40 is interposed between the now primary intermediate foil 36 and the bump foil to decrease sway space and thereby increase foil bearing stiffness in the first support direction. While the secondary intermediate foil 40 is illustrated as disposed between intermediate foil 36 and bump foil 24, it is to be understood that secondary intermediate foil 40 and the wavy shim positions may be reversed. In FIG. 11, the bump foil 24 is sandwiched between the top foil 22 and the bump foil 24 such that the top of the wavy shim contacts a bottom surface of the top foil and the bottom of the wavy shim contacts the top of the bump foil to respectively abut or overlap the top foil and bump foil, thereby decreasing the sway space of the anisotropic foil bearing in the first support direction relative to the second support direction and increasing the stiffness thereat.

Figure 12:
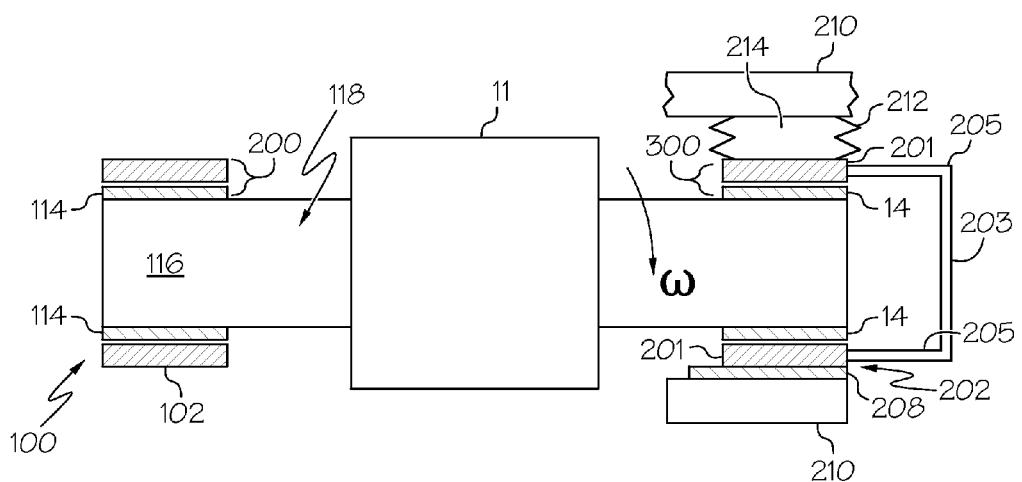
FIG. 12 is a simplified view of a rotor-bearing system, illustrating a pair of rotor support structures supporting the rotatable shaft, the rotor support structure on the left in the figure including an anisotropic foil bearing surrounded by an isotropic bearing housing and the rotor support structure on the right of the figure including an isotropic foil bearing surrounded by an anisotropic bearing housing having an external damping device on the outer diameter thereof, in accordance with exemplary embodiments.
Figure 16:
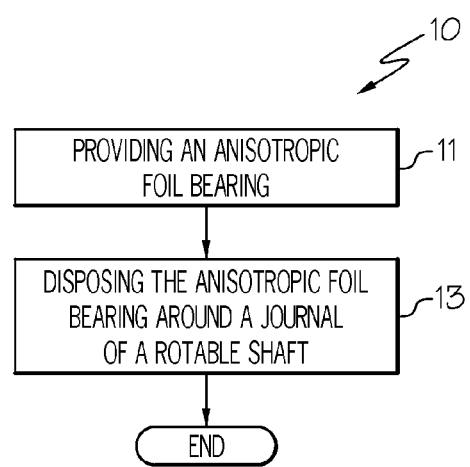
FIG. 16 is a flow diagram of an exemplary method for controlling the non-synchronous vibration of rotating machinery in accordance with exemplary embodiments.

Referring again to FIG. 16, method 10 continues by disposing the anisotropic foil bearing of a rotor support structure 200 around the journal of the rotatable shaft (step 13). Referring now to FIG. 12, a rotor-bearing system 100 is schematically shown. Rotor-bearing system includes a pair of rotor support structures 200 and 300 for supporting the rotor shaft 18/118. In general, rotor support structure 200 comprises an anisotropic foil bearing (such as, for example, 114*a*, 114*b*, or 114*c*) surrounded by an isotropic bearing housing 102. While two rotor support structures are shown in FIG. 12, it is to be understood that additional rotor support structures to support the rotor may be used. Any of the anisotropic foil bearings 114*a* through 114*c* such as described above may be included in the rotor support structure 200. The isotropic bearing housing 102 is a conventional bearing housing as known to one skilled in the art.

Figure 13:
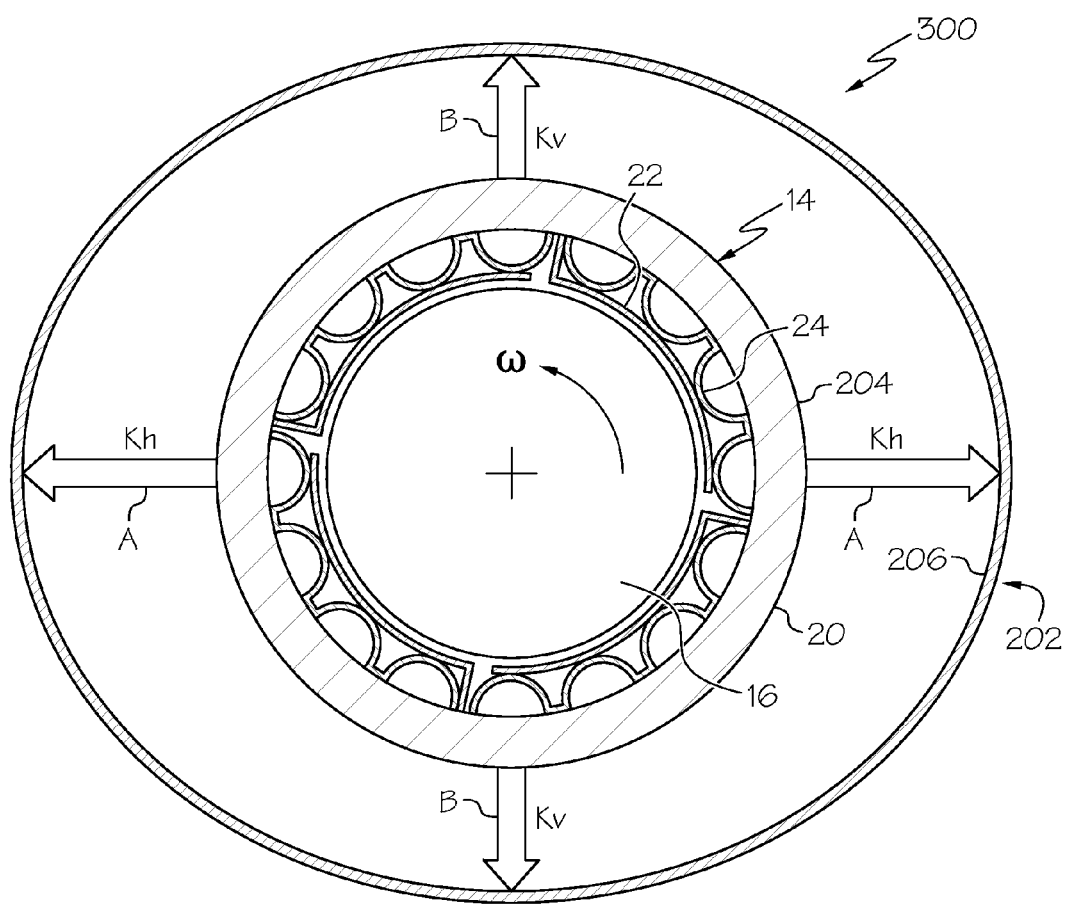
FIG. 13 is a cross-sectional view of the rotor support structure on the right of FIG. 12, illustrating the exemplary conventional isotropic foil bearing of FIG. 1 surrounded by the anisotropic bearing housing of FIG. 12, in accordance with exemplary embodiments.

Still referring to FIG. 12 and now to FIGS. 13 through 14, in accordance with another exemplary embodiment, rotor support structure 300 comprises an isotropic foil bearing 14 such as shown in FIG. 1 surrounded by an anisotropic bearing housing 202 (FIG. 14). It is to be understood that the configuration of the isotropic foil bearing is not limited to that shown in FIG. 1 and that any isotropic foil bearing may be used within the anisotropic bearing housing 202 in rotor support structure 300 to provide anisotropy. Anisotropic bearing housing 202 comprises at least two rings 201 and 203 connected by asymmetrically arranged beams 205. Ring 201 may be integrally formed with ring 203 as illustrated or may be a separate piece. The outer diameter of the aft ring 203 may be off-centered to the inner diameter of the variable diameter forward ring 201. The length, cross-section, and number of the beams 205 may determine the stiffness of the anisotropic bearing housing 202. Anisotropic bearing housing 202 supports the bearing sleeve 20 in a manner such that the support stiffness is different in the first support direction from that in the second support direction that is substantially orthogonal to the first support direction. That is, the anisotropic bearing housing 202 provides for the anisotropic support of the isotropic foil bearing 14 by varying the beam length, cross-section, number, or a combination thereof in a first support direction relative to the second support direction. The dimensions of the beams and their placement in a non-symmetrical fashion may provide the required anisotropy to the support stiffness characteristic, thereby substantially controlling non-synchronous vibrations. While the illustrated embodiment includes six beams, it is to be understood that any number of beams or other structural members may be provided between rings 201 and 203.

It is to be understood that while the first support direction in the illustrated anisotropic bearing housing of FIG. 13 is a horizontal direction and the second support direction is a vertical direction, the first support direction may be any direction (i.e., it is not necessarily vertical or horizontal as long as the second support direction is substantially orthogonal to the first support direction), i.e., the first and second directions are substantially orthogonal. As illustrated, the stiffness, K, of the rotor support structure 300 in the horizontal direction ($K_h$) is less than the stiffness, $K_V$. Referring again to FIG. 12, an external damping device may be included with the anisotropic bearing housing 202 in rotor support structure 300 to control synchronous vibration. Rotor support structure 300 includes a mechanical damper 208 (shown schematically) disposed at an outer diameter of the anisotropic bearing housing 202 between the anisotropic bearing housing 202 and a rotor housing 210. The mechanical damper 208 may be, for example, a metal mesh composite or a damping treatment such as supplied by Metco Industries, 1241 Brussels St., St. Marys, Pa. 15857 (USA) may be applied to the anisotropic bearing housing or between the anisotropic bearing housing and another housing (not shown) that supports the foil bearing assembly. A sealed damper 212 with sealing fluid 214 is illustrated in parallel with the mechanical damper 208. The sealing fluid 214 may be, for example, oil, a synthetic fluid, or a silicone-based fluid. While the anisotropic bearing housing 202 is illustrated with an external damping device, it is to be understood that the external damping device is optional.

Figure 15:
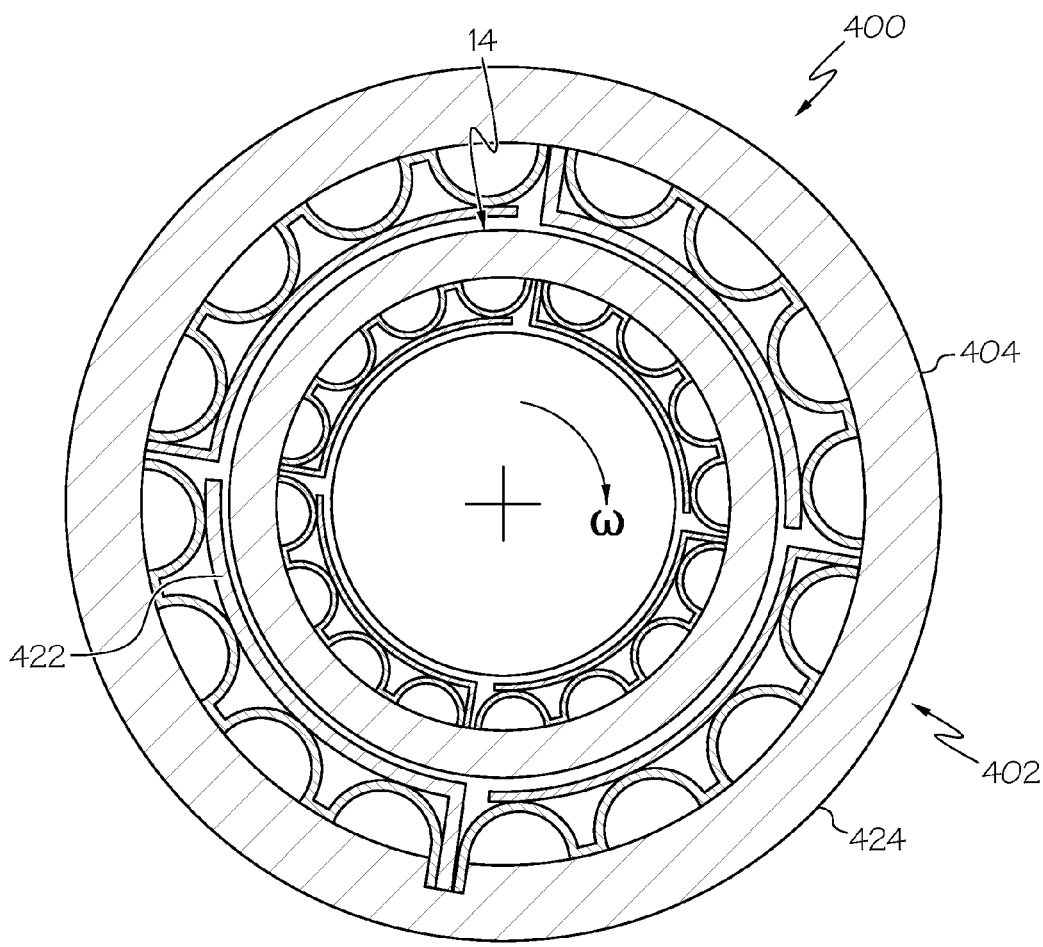
FIG. 15 is a cross-sectional view of a rotor support structure according to another exemplary embodiment, illustrating the exemplary isotropic foil bearing of FIG. 1 surrounded by an anisotropic bearing housing lined with a plurality of housing foils having at least one foil characteristic that differ(s) in the first support direction relative to the second support direction (in this case, the bearing housing top foil is thicker in the first support direction relative to the second support direction)

Referring now to FIG. 15, in another exemplary embodiment, the illustrated rotor support structure 400 comprises an anisotropic bearing housing 402 surrounding an isotropic foil bearing 14 such as shown in FIG. 1. The anisotropic bearing housing 402 comprises an annular ring 404 lined with at least one foil (a housing top foil 422 and a housing bump foil 424 are illustrated), at least one housing foil having a foil stiffness in the first support direction that is different from that in the second support direction as described above in connection with the anisotropic foil bearing. The illustrated anisotropic bearing housing 402 in FIG. 15 has been configured such that foil thickness of housing top foil 422 is greater in a first support direction than in a second support direction that is substantially orthogonal to the first support direction i.e., housing top foil 422 is thinner in the second support direction. The thicker housing top foil 422 at diametrically and circumferentially opposed sections in the first support direction of the exemplary anisotropic bearing housing 402 of FIG. 15 is stiffer than the thinner housing top foil, thereby increasing the foil stiffness in the anisotropic bearing housing 402 in the first support direction relative to the second support direction. Thus, for anisotropic bearing housing 402, the stiffness provided in the first support direction is greater than the stiffness provided in the second support direction. The damping in the first support direction may also be greater or lower than the damping in the second support direction, although damping may be the same in both the first and second support directions. It is to be understood that the first support direction may be any direction (i.e., it is not limited to the direction illustrated in FIG. 15) as long as the second support direction is substantially orthogonal to the first support direction, i.e., the first and second directions are substantially orthogonal. It is also to be understood that the foil stiffness of the at least one housing foil in the anisotropic bearing housing 402 may be affected by changing one or more of the foil characteristics as described above in connection with changing the foil stiffness of the at least one foil in the anisotropic foil bearings 114a, 114b, and 114c. Housing top foil 422 and housing bump foil 424 may have the same or similar composition and form as, respectively, the top foil 22 and bump foil 24 of the foil bearing. Anisotropic bearing housing 402 may further comprise at least one housing intermediate foil (not shown) in the same manner as the at least one intermediate foil 36. In addition, the isotropic foil bearing surrounded by anisotropic bearing housing 402 is not limited to the isotropic foil bearing 14 illustrated in FIG. 1.

In operation, the journal and foil bearing top foil are in contact when stationary and at low journal rotational speeds. The journal and top foil are configured such that when the shaft rotates at a sufficient operational speed, the foil and the journal separate from each other to form the annular clearance gap. The foil bearing is unidirectional, with the shaft rotating from free end to fixed end of the top foil. As the annular clearance gap between the top foil and the journal grows, a support fluid is drawn in between the rotor shaft and the top foil, creating the fluid film between the outer surface of the rotor shaft and the top foil to allow the rotor shaft to rotate with low friction and to serve as a load support and act as a lubricant to the rotating component and surrounding static components. The support fluid may be ambient air, inert gasses, compressed air, turbine exhaust air, or the like. As the sway space and/or the foil stiffness in one support direction relative to the other support direction is/are different (in the case of the anisotropic foil bearing) or because the radial clearance of the bearing housing in one support direction relative to the other support direction is different (in the case of the anisotropic bearing housing), the loads that cause non-synchronous vibrations are controlled. The rotating shaft is capable of being displaced to a maximum dimensional extent within the established sway space without contacting the top foil by the bump foil absorbing substantially all shock waves causing said displacement. However, displacements can exceed the sway space for short durations (i.e., during transition through critical speeds or at high static loads).

From the foregoing, it is to be appreciated that the rotor support structure including the anisotropic foil bearing or the anisotropic bearing housing provides anisotropic stiffness to the rotating machinery, thereby controlling non-synchronous vibration thereof. Such rotor support structure and anisotropic foil bearing are relatively lightweight and capable of being retrofitted into existing rotating machinery, such as a gas turbine engine.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A rotor support structure for controlling non-synchronous vibrations of rotating machinery, the rotor support structure comprising:
 a foil bearing adapted to be disposed around a journal of a rotating rotor shaft, the foil bearing comprising:

a bearing sleeve comprising an inner bore therethrough having a diameter to define a sway space between an inner circumferential surface of the bearing sleeve and an outer surface of the journal; and at least two foils radially disposed within the sway space, each foil having a foil stiffness and the at least two foils comprising a top foil and a bump foil, the bump foil comprising a series of bumps, and the at least two foils including at least one intermediate foil disposed between the top foil and the bump foil; and a bearing housing disposed around the foil bearing, wherein the foil bearing is configured to be anisotropic, exhibiting a stiffness in a first support direction that varies in magnitude from that in a second support direction that is substantially orthogonal to the first support direction, at least one foil of the at least two foils has a foil thickness, a foil height, a foil pitch, a foil pitch ratio, or combinations thereof in the first support direction that is different from that in the second support direction, wherein the at least one foil comprises the bump foil, the series of bumps in the first support direction are configured with the foil thickness, the foil height, the foil pitch, the foil pitch ratio, or combinations thereof that are different than the series of bumps in the second support direction, wherein the at least one intermediate foil comprises a wavy shim having a series of waves, each wave having a cross-sectional shape, a wave height, and a wave pitch.

2. An anisotropic foil bearing comprising:

a bearing sleeve comprising an inner bore therethrough having a diameter to define a sway space between an inner circumferential surface of the bearing sleeve and an outer surface of a rotating rotor shaft; and at least two foils circumferentially disposed within the bearing sleeve, each foil having a foil stiffness and the at least two foils comprising a top foil and a bump foil, the bump foil comprising a series of bumps, the at least two foils including at least one intermediate foil disposed between the top foil and the bump foil, thereby decreasing a magnitude of the sway space, wherein the foil stiffness of at least one foil of the at least two foils in a first support direction is configured to be different from that in a second support direction that is substantially orthogonal to the first support direction, resulting in overall stiffness of the anisotropic foil bearing being different in the first support direction from that in the second support direction, the at least one foil is configured with a foil thickness, a foil height, a foil pitch, a foil pitch ratio, or combinations thereof that is different in the first support direction from that in the second support direction, wherein the at least one foil comprises the bump foil, the series of bumps in the first support direction are configured with the foil thickness, the foil height, the foil pitch, the foil pitch ratio, or combinations thereof that are different than the series of bumps in the second support direction, wherein the at least one intermediate foil comprises a wavy shim having a series of waves, each wave having a cross-sectional shape, a wave height, and a wave pitch, and a radial clearance differs in the first support direction relative to the second support direction by varying thereat the bump height, the wave height, or both the bump and wave height.

3. The anisotropic foil bearing of claim 2, wherein the at least two foils overlap or abut each other to decrease the magnitude of the sway space.

4. The anisotropic foil bearing of claim 2, wherein the foil thickness is increased in diametrically and circumferentially opposed sections in the first support direction relative to the second support direction, the thicker foil being stiffer and reducing the sway space thereat.

5. A method for controlling non-synchronous vibrations in rotating machinery including a rotor support structure for supporting a rotatable shaft, the method comprising the steps of:

providing an anisotropic foil bearing adapted to be included in the rotor support structure, the anisotropic foil bearing comprising a bearing sleeve lined with at least two foils comprising a top foil and bump foil, the foil bearing further comprising an intermediate foil disposed between the top foil and the bump foil, the bump foil comprising a series of bumps, each foil having a foil stiffness; and disposing the anisotropic foil bearing around a journal of the rotatable shaft, wherein the step of providing the anisotropic foil bearing comprises making the foil stiffness in a first support direction different from that in a second support direction substantially orthogonal to the first support direction such that an overall foil bearing stiffness varies in substantially orthogonal directions, wherein the step of providing the anisotropic foil bearing comprises configuring at least one foil of the at least two foils with a foil thickness, a foil height, a foil pitch, a foil pitch ratio, or combinations thereof that is different in the first support direction from that in the second support direction, wherein the at least one foil comprises the bump foil, the series of bumps in the first support direction are configured with the foil thickness, the foil height, the foil pitch, the foil pitch ratio, or combinations thereof that are different than the series of bumps in the second support direction and the intermediate foil comprises a wavy shim having a series of waves, each wave having a cross-sectional shape, a wave height, and a wave pitch.

* * * * *